United States Patent [19]
Watanabe et al.

[11] 3,926,915
[45] Dec. 16, 1975

[54] PROCESS FOR PRODUCTION OF ACRYLIC ACID

[75] Inventors: Yoshihisa Watanabe; Makoto Imanari; Naohiro Nojiri; Nobuhiko Fuga, all of Ami, Japan

[73] Assignee: Mitsubishi Petrochemical Company Limited, Tokyo, Japan

[22] Filed: Oct. 10, 1973

[21] Appl. No.: 405,140

[30] Foreign Application Priority Data
Oct. 16, 1972 Japan............................. 47-102648

[52] U.S. Cl.............................. 260/530 N; 252/456
[51] Int. Cl.².................... C07C 51/26; C07C 57/04
[58] Field of Search................................ 260/530 N

[56] References Cited
UNITED STATES PATENTS

| | | | |
|---|---|---|---|
| 3,544,624 | 12/1970 | Anderson et al. | 260/530 N |
| 3,557,199 | 1/1971 | Parthasarathy et al. | 260/530 N |

*Primary Examiner*—James A. Patten
*Assistant Examiner*—Richard D. Kelly
*Attorney, Agent, or Firm*—Robert E. Burns; Emmanuel J. Lobato; Bruce L. Adams

[57] ABSTRACT

A process for production of acrylic acid by vapor phase catalytic oxidation of acrolein comprising effecting the catalytic oxidation in the presence of a catalyst comprising (1) oxides of molybdenum, (2) oxides of niobium, (3) oxides of silicon, and (4) oxides of vanadium.

3 Claims, 1 Drawing Figure

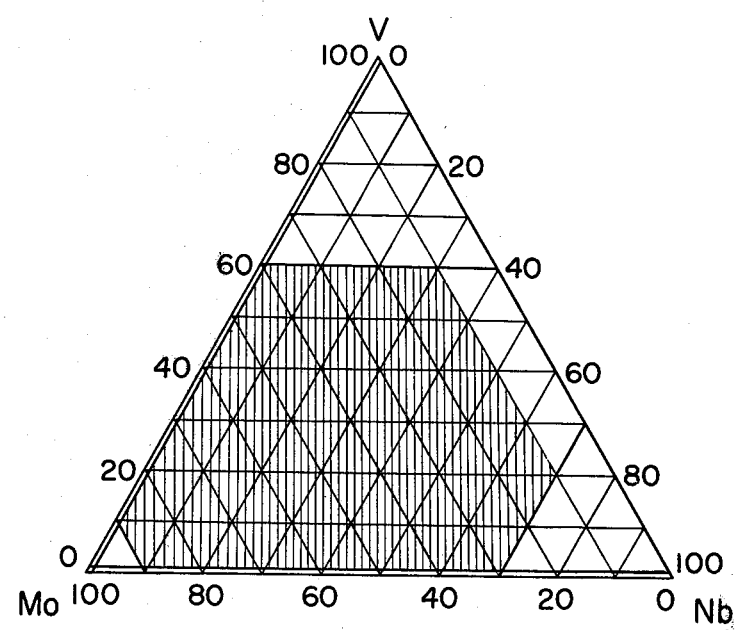

PROCESS FOR PRODUCTION OF ACRYLIC ACID

BACKGROUND OF THE INVENTION

1. Technical Field

The present invention relates to a procses for the production of acrylic acid by vapor phase catalytic oxidation of acrolein.

More specifically, the present invention is concerned with a process for the production of acrylic acid by vapor phase oxidation of acrolein in the presence of a catalyst primarily composed of oxides of (1) molybdenum, (2) vanadium, (3) niobium and (4) silicon.

2. Prior Art

In the past, there have been proposed many catalysts for use in the production of acrylic acid by vapor phase catalytic oxidation of acrolein. Among these catalysts, the catalysts primarily composed of a combination of molybdenum and vanadium in the form of an oxide exhibit a relatively good performance, and thus a great variety of these catalysts are known. Although these catalysts may provide fairly good results, it is to be understood that they are not completely satisfactory. For example, in the process disclosed in Japanese Patent Publication No. 1775/1966, the catalyst disclosed is composed of oxides of molybdenum and vanadium deposited on silica gel, and the highest single-pass yield of acrylic acid at a reaction temperature of 300°C according to this reference is 76% based on the acrolein fed. As a consequence, it seems that there is still room for further improvement in both activity and selectivity of the catalyst.

Japanese Patent Publication No. 26287/1969 discloses a catalyst species primarily composed of oxides of molybdenum, vanadium and aluminum deposited on an aluminum sponge. This catalyst is known to show extremely good activity and selectivity when it is treated with a gaseous raw material prior to use. However, in order to ensure that a stable production of the catalyst is carried out on an industrial scale, particular considerations are needed since the catalyst must be subjected to activation treatment and since an aluminum sponge which is relatively difficult to produce must be used as a carrier.

Further, examples of catalysts composed of molybdenum and niobium are disclosed in Japanese Patent Publication Nos. 4855/1970, 12724/1970, and 18013/1971. However, these catalysts also seem to possess room for further improvement in both activity and selectivity for practical use.

SUMMARY OF THE INVENTION

The applicants have made studies to remove the aforementioned disadvantages and to provide a new catalyst suitable for the production of acrylic acid by oxidation of acrolein which is excellent in activity and selectivity, is easy to use for industrial purposes, and, further, is simple to produce. As a result, they have, unexpectedly, discovered that catalysts composed of oxides of (1) Mo, (2) V, (3) Nb, and (4) Si have extremely excellent activity and selectivity and have thereby arrived at this invention.

Therefore, the process for the production of acrylic acid according to the present invention is characterized in that vapor phase catalytic oxidation of acrolein is carried out in the presence of a catalyst composed of oxides of (1) molybdenum, (2) vanadium, (3) niobium and (4) silicon.

In accordance with the present invention, another process for the production of acrylic acid by vapor phase catalytic oxidation of acrolein is characterized in that the catalytic oxidation is carried out in the presence of a catalyst composed of oxides of molybdenum, niobium, vanadium, and silicon, the ratio of molybdenum, niobium and vanadium (based on gram atom percent) being within a hexagonal region bounded by two straight lines respectively representing 10% and 90% molybdenum, 0.01% and 70% niobium, and 0.01% and 60% vanadium, respectively, in the triangular composition diagram shown in the accompanying drawing.

BRIEF DESCRIPTION OF THE DRAWING

The drawing is a triangular composition diagram indicating the proportions (by gram atom percent) of V of a catalyst of this invention.

DETAILED DESCRIPTION

The catalyst used in the process of the present invention possesses extremely good performance. For example, when acrolein is oxidized in the presence of a catalyst composed of molybdenum oxide, vanadium oxide, niobium oxide, and silicon oxide deposited on a porous alumina carrier (manufactured by Fujimi Kenmazai K.K.) in an amount of 30% by weight of the final catalyst composite at a reaction temperature of 250°C, the single pass yield of acrylic acid substantially amounts to 90%.

Although the reason why such catalysts composed of the four types of oxide exhibit surprisingly better performance than catalysts composed of two elements, that is, molybdenum-vanadium or molybdenum-niobium is not known with certainty, it may be inferred from the result of differential thermal analysis that thermal change temperatures of molybdenum, vanadium and niobium are different from those of both molybdenum-vanadium and molybdenumniobium and, thus, heating of a mixture of molybdenum compound, vanadium compound and niobium compound results in formation of a ternary oxide compound distinctivity different from those compounds as produced from either of the binary component system. In particular, it is essential that silicon be included in the catalyst of the present invention. To be exact, it may be presumed that the four elements of molybdenum, vanadium and silicon constitute a polycompound consisting of their respective oxides.

The catalyst used in the process of the present invention is not only excellent in performance as described hereinabove but can be readily prepared as described hereinafter. The mechanical strength of the catalyst after pelletizing is fufficiently high.

Further, due to its high activity, only a small amount of the catalyst need be deposited on a porous carrier so as to obtain satisfactory results. Accordingly, the catalyst of the present invention is advantageous from both the mechanical strength and cost standpoints.

1. Catalyst

1. Preparation

The catalyst used in the process of the present invention may be prepared by any of the known methods of multi-metal oxide catalyst preparation. In general, it is preferable to adopt a method comprising forming aqueous solutions or suspensions respectively of the compounds, particularly watar soluble compounds, of molybdenum, vanadium and niobium which are ordinarily decomposed to the respective metal oxides by heating and mixing these solutions or suspensions in sequence or simultaneously. Alternatively, the solid, soluble starting compounds are dissolved in a single solution.

For example, the catalyst of the invention may be prepared according to the following procedure.

Compounds of (1) molybdenum, (2) vanadium, and (3) niobium such as ammonium paramolybdate, ammonium metavanadate; niobium chloride, niobium oxalate, niobium oxide or niobium hydroxide; are mixed, or these compounds are preferably dissolved in suitable solvents to form a homogeneous solution. Silica sol or silica gel is uniformly dispersed in the resulting solution while stirring. The resulting mixture or slurry is then evaporated to dryness. The solid cake thus produced is pulverized. The resulting powder with or without pelletizing is thermally decomposed at a temperature of from 300°C to 500°C. The heat-treated powder is pelleted or it is placed in a mill in a predetermined amount and thoroughly crushed with the addition of water. Following this, the crushed powder particles are deposited on a carrier such as porous alumina or silicon carbide and fired at a temperature of from 300°C to 600°C for the prescribed period. The catalyst thus produced can further be processed into tablets, discs or other suitable catalyst forms. The above-described solution or suspension of compounds of the catalyst constituents may include ammonia, amine, volatile organic compounds and other supplementary materials.

The finally fired catalyst is considered to be a mixture or compound of the oxides of (1) molybdenum, (2) vanadium, (3) niobium and (4) silicon, but the exact structure of the catalyst is not known with any degree of certainty.

Thus, it seems advisable to call the catalyst "a catalytic active composition composed of oxides of the specified metals" or "a catalytic complex composed of the specified metals."

2. Catalyst composition

Although the compositional structure of the catalyst according to the present invention is not clear, the catalyst comprises, in terms of the content of metal species, 10 to 90% molybdenum, preferably 20 to 90%, 0.01 to 60% vanadium, preferably 1 to 50%, and 0.01 to 70% niobium, preferably 1 to 65%, based on 100% (atomic percentages) of the total amount of molybdenum, vanadium and niobium. In particular, the catalysts having compositions within the shadowed portion shown in the accompanying triangular composition diagram exhibit extremely good performance. Further, the presence of silicon oxide is essential for the catalyst of the present invention. Silicon oxide is desirably present in an amount of less than about 200 atomic %, preferably 1 to 180 atomic %, based on the total amount of the above three metals.

2. Catalytic vapor phase oxidation of acrolein

The catalytic oxidation reaction of the present invention is ordinarily carried out at a temperature of from 200°C to 350°C, preferably from 210°C to 330°C, and at a pressure of from 0.5 to 10 atmospheres, gauge.

The contact time of a mixture of acrolein, molecular oxygen (preferably, air) and a diluent/preferably, steam, with the catalyst is suitably from 0.5 to 10 seconds.

The moleratios of ingredients in a gaseous feed mixture are from 0.5 to 4 moles of molecular oxygen and from 1 to 20 moles of steam permole of acrolein.

In general, air is used as the source of molecular oxygen. However, pure oxygen per se or mixtures of oxygen and inert gases such as carbon dioxide, nitrogen, etc. may also be used.

Except for the use of the specific catalysts as described hereinabove, the process of vapor phase catalytic oxidation of acrolein according to the present invention is substantially identical to that ordinarily employed in the prior art.

EXAMPLE 1

Catalyst preparation 42.4 g of ammonium paramolybdate and 7 g of ammonium metavanadate were dissolved in 320 ml of distilled water with heating. 6.42 g of niobium hydroxide (Nb(OH)$_n$, 82.8% by weight in terms of Nb$_2$O$_5$) were dissolved in a hot aqueous solution of 12.6 g of oxalic acid dihydrate (2.5 times the mole number of niobium atom) in 100 ml of distilled water at a temperature of 90°C.

The resulting solution was added to the first solution. To the resulting mixture was then added 75 g of an aqueous silica sol (the commercial name "Snowtex N," containing 20% by weight of SiO$_2$).

The resulting mixture was evaporated to dryness while stirring, and the resulting powder was fired at 350°C for 1 hour. To 27 g of the fired powder was added 27 ml of distilled water to form an aqueous slurry. After thorough wet milling in a mill, the slurry was deposited on 50 g of a spherical, porous α-alumina carrier having an external diameter of 5 mm (manufactured by Fuji Kenmazai K.K., Japan). The catalyst deposited on the carrier was then fired in an electric furnace in the presence of air at 380°C for 3 hours.

This catalyst had a composition of Mo, V, Nb and Si in an atomic ratio of 70.5:17.8:11.7:73.4 and constituted 32.8% by weight of the total catalyst composite.

Oxidation reaction 20 ml of the catalyst was placed in a stainless steel reactor tube having an inner diameter of 15 mm.

A gaseous mixture of 3.6% acrolein, 46% air, 41% steam and 9.4% nitrogen, all percentages by volume, was passed over the catalyst with a contact time of 4.3 seconds (calculated in terms of NTP) at a temperature of 230°C at atmospheric pressure.

The result of the reaction was as follows:

| | Percent |
|---|---|
| Conversion of acrolein | 97.3 |
| Selectivity to acrylic acid | 90.2 |
| Single-pass yield of acrylic acid | 87.8 |

In addition, acetaldehyde, acetic acid, carbon monoxide and carbon dioxide were by-produced.

EXAMPLE 2

Catalyst preparation 42.4 g of ammonium paramolybdate and 7 g of ammonium metavanadate were dissolved in 380 ml of distilled water with heating. To the solution was added 32.1 g of niobium hydroxide (82.8% by weight in terms of Nb$_2$O$_5$), and then 150 g of an aqueous silica sol (the commercial name "Snowtex N," containing 20% by weight of SiO$_2$, manufactured by Nissan Kagaku Kogyo K.K., Japan) was further added to the solution.

The resulting mixture was evaporated to dryness with stirring. The resulting powder was fired at 350°C for one hour. To 27 g of the fired powder was added 27 ml of distilled water to form an aqueous slurry. After thorough wet milling in a mill, the slurry was deposited on 50 g of a spherical, porous α-alumina carrier having an external diameter of 5 mm (manufactured by Fujimi Kenmazai K.K., Japan). Following this, the catalyst deposited on the carrier was fired in an electric furnace in the presence of air at 380°C for 3 hours.

This catalyst had a composition of Mo, V, Nb and Si with an atomic ratio of 48:12:40:100 and constituted 32.8% by weight of the total catalyst composite.

Oxidation reaction

The catalytic oxidation of acrolein with this catalyst was carried out under the same conditions as those described in Example 1.

The result of the reaction was as follows:

|  | Percent |
|---|---|
| Conversion of acrolein | 98.5 |
| Selectivity to acrylic acid | 89.6 |
| Singlepass yield of acrylic acid | 88.2 |

In addition, acetaldehyde, acetic acid, carbon monoxide, and carbon dioxide were by-produced.

EXAMPLE 3

Catalyst preparation

A hot solution of 7 g of ammonium metavanadate in 140 ml of distilled water was added to a warm solution of 42.4 g of ammonium paramolybdate in 140 ml of distilled water. To the resulting mixture were added 5.4 g of niobium pentachloride and 150 g of an aqueous silica sol (the commercial name "Snowtex N," containing 20% by weight of $SiO_2$, manufactured by Nissan Kagaku Kogyo K.K., Japan). The resulting mixture was evaporated to dryness with stirring. The resulting powder was fired at 300°C for 1 hour.

To 27 g of the fired powder was added 27 ml of distilled water to form an aqueous slurry. After thorough wet milling in a mill, the slurry was deposited on 50 g of a spherical, porous α-alumina carrier having an external diameter of 5 mm (manufactured by Fujimi Kenmazai K.K., Japan). Thereafter, the catalyst deposited on the carrier was fired in an electric furnace in the presence of air at 400°C for 3 hours.

This catalyst had a composition of Mo, V, Nb and Si with an atomic ratio of 75:18.75:6.25:156 and constituted 30.8% by weight of the total catalyst composite.

Oxidation reaction

The catalytic oxidation of acrolein with this catalyst was carried out under the same conditions as those described in Example 1 except that the reaction temperature was 250°C.

The results of the reaction were as follows:

|  | Percent |
|---|---|
| Conversion of acrolein | 97.5 |
| Selectivity to acrylic acid | 89.3 |
| Single-pass yield of acrylic acid | 87.1 |

In addition, acetaldehyde, acetic acid, carbon monoxide and carbon dioxide were by-produced.

EXAMPLE 4

Catalyst preparation 42.4 g of ammonium paramolybdate and 7 g of ammonium metavanadate were dissolved in 320 ml of distilled water with heating.

To the resulting solution was added 50 ml of distilled water containing 5.4 g of niobidum pentachloride. To the resulting mixture were added 14.66 g of monoethanol amine and, further, 150 g of an aqueous silica sol ($SiO_2$ content of 20% by weight). The resulting mixture was evaporated to dryness with stirring. The powder so formed was fired at 300°C for 1 hour.

To 27 g of the fired powder was added 27 ml of distilled water to form an aqueous slurry. After thorough wet milling in a mill, the slurry was deposited on 50 g of a spherical, porous α-alumina carrier having an external diameter of 5 mm (manufactured by Fujimi Kenmazai K.K., Japan). Following this operation, the catalyst deposited on the carrier was fired in an electric furnace in the presence of air at 400°C for 3 hours.

This catalyst had a composition of Mo, V, Nb and Si with an atomic ratio of 75:18.75:6.25:156 and constituted 30.8% by weight of the total catalyst composite.

Oxidation reaction

The catalytic oxidation of acrolein with this catalyst was carried out under the same conditions as those described in Example 1 except that the reaction temperature was 250°C.

The results of the reaction were follows:

|  | Percent |
|---|---|
| Conversion of acrolein | 97.4 |
| Selctivity to acrylic acid | 92.5 |
| Single-pass yield of acrylic acid | 90.1 |

In addition, acetaldehyde, acetic acid, carbon monoxide and carbon dioxide were by-produced.

EXAMPLES 5 – 10 AND COMPARATIVE EXAMPLES 1 – 4

The following catalysts of different composition shown in Table 1 were prepared according to the procedure described in Example 2.

The catalytic oxidation of acrolein with each of these catalysts was carried out under the same conditions as those described in Example 1.

The results of these reactions are shown in Table.

EXAMPLE A 11

Catalyst preparation 42.4 g of ammonium paramolybdate and 7 g of ammonium metavanadate were dissolved in 320 ml of distilled water with heating. To the solution was added 6.42 g of niobium hydroxide (82.8% by weight in terms of $Nb_2O_5$), and then 75 g of an aqueous silica sol (the commercial name "Snowtex N," containing 20% by weight of $SiO_2$, (manufactured by Nissan Kagaku Kogyo K.K., Japan) was added. The resulting mixture was evaporated to dryness with stirring. The resulting powders were shaped into pellets of 5 mm diameter and 4 mm length in a pelleting machine. The catalyst pellets were fired in an electric furnace in the presence of air at 380°C for 3 hours.

This catalyst had a composition of Mo, V, Nb and Si with an atomic ratio of 70.5:17.8:11.7:73.5.

Table

| | | Catalyst composition (atomic ratio) | | | | Reaction temp. (°C) | Percent conversion of acrolein | Percent selectivity to acrylic acid | Percent single-pass yield of acrylic acid |
|---|---|---|---|---|---|---|---|---|---|
| | | Mo | V | Nb | Si | | | | |
| Example | 5 | 30 | 7.5 | 62.5 | 147 | 250 | 89.2 | 85.6 | 7.64 |
| | 6 | 30 | 40 | 30 | 147 | 250 | 95.7 | 73.9 | 70.8 |
| | 7 | 34 | 9 | 57 | 71.4 | 230 | 98.2 | 85.9 | 84.4 |
| | 8 | 50 | 40 | 10 | 73.5 | 250 | 91.7 | 76.4 | 70.0 |
| | 9 | 70.5 | 17.8 | 11.7 | 73.5 | 250 | 97.0 | 89.4 | 86.7 |
| | 10 | 48 | 12 | 40 | 100 | 230 | 98.5 | 89.6 | 88.2 |
| Comparison | 1 | 10 | 70 | 20 | 147 | 270 | 74.2 | 26.0 | 19.3 |
| | 2 | 0 | 50 | 50 | 104 | 270 | 56.6 | 34.5 | 19.5 |
| | 3 | 80 | 20 | 0 | 208 | 270 | 42.0 | 73.7 | 30.9 |
| | 4 | 70.5 | 17.8 | 11.7 | 0 | 270 | 15.8 | 67.1 | 10.6 |

Oxidation reaction

The catalytic oxidation of acrolein with this catalyst was carried out under the same conditions as those describe in Example 1 except that the reaction temperature was 210°C.

The results of the reaction were as follows:

| | Percent |
|---|---|
| Conversion of acrolein | 95.4 |
| Selectivity to acrylic acid | 85.1 |
| Single-pass yield of acrylic acid | 81.2 |

In addition, acetaldehyde, acetic acid, carbon monoxide and carbon dioxide were by-produced.

What we claim is:

1. A process for producing acrylic acid which comprises subjecting acrolein to catalytic vapor phase oxidation with molecular oxygen over an oxidation catalyst at a temperature of from 200°C to 350°C and under a pressure of from 0.5 atmosphere to 10 atmosphere, gauge wherein said oxidation catalyst consists essentially of the oxides of (1) molybdenum (2) vanadium (3) niobium and (4) silica and wherein said catalyst consists of:

| | gram atomic percent |
|---|---|
| (1) molybdena | 10 – 90 |
| (2) vanadia | 0.01 – 60 |
| (3) niobium oxide | 0.01 – 70 |
| and (4) silica | up to 200% | based on the total atomic atoms of molybdenum, vanadium and of niobium.

2. A process for producing acrylic acid as claimed in claim 1 in which the composition of said catalyst is: molybdenum from 20 to 90%, vanadium from 1 to 50%, niobium from 1 to 65% and silicon from 1 to 180%, all based on the total atoms of molybdenum, vanadium and niobium.

3. A process for producing acrylic acid as claimed in claim 1 in which said molybdenum, niobium and vanadium oxides (based on gram atom percent) in said catalyst is 10% and 90% molybdenum, 0.01% and 70% niobium, and 0.01% and 60% vanadium, as their oxides the total of said molybdenum, niobium and vanadium being 100 percent.

* * * * *